Figure 1:
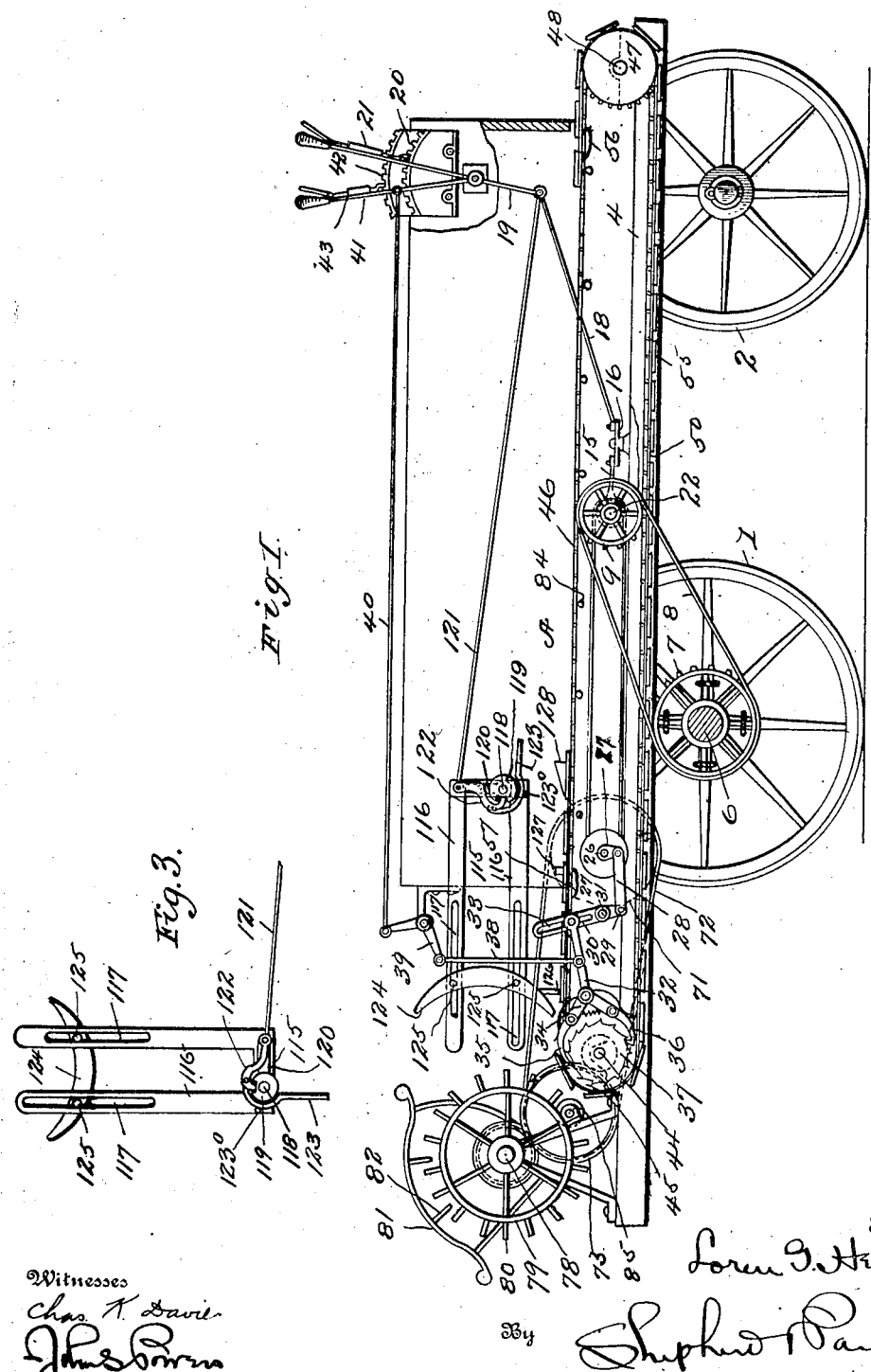

L. G. HERRICK.
FERTILIZER DISTRIBUTER.
APPLICATION FILED SEPT. 18, 1906.

904,127.

Patented Nov. 17, 1908.

2 SHEETS—SHEET 2.

WITNESSES
W. Rees Edelen.
B. G. Gardner.

INVENTOR
Loren G. Herrick
by Shepherd & Parker
Attorneys.

UNITED STATES PATENT OFFICE.

LOREN G. HERRICK, OF LUVERNE, MINNESOTA.

FERTILIZER-DISTRIBUTER.

No. 904,127.        Specification of Letters Patent.    Patented Nov. 17, 1908.

Application filed September 18, 1906.  Serial No. 335,148.

*To all whom it may concern:*

Be it known that I, LOREN G. HERRICK, a citizen of the United States, residing at Luverne, in the county of Rock and State of Minnesota, have invented certain new and useful Improvements in Fertilizer - Distributers, of which the following is a specification.

This invention has reference to improvements in fertilizer distributers, and more especially to that class of distributers wherein a reversible conveyer is employed, and consists of certain novel features of construction which will be hereinafter fully described in the specification, illustrated in the drawings and particularly pointed out in the appended claims.

The object of the invention is to provide a removably secured fertilizer distributer whereby the material will be evenly distributed on the ground through automatic means in combination with the mechanism under the control of the driver.

A further object of the invention is to so construct the mechanism operating the conveyer that the speed of the conveyer can be changed by the driver when the wagon and its distributing mechanism is in motion, as some soils are richer than others and consequently do not require the same amount of fertilizing material as poorer soils.

A further object of the invention is to so construct the mechanism operating the conveyer that the conveyer can be returned at a much greater speed to its normal position for another distribution of the fertilizing properties.

A further object of the invention is to have the distributer removably secured to an ordinary wagon, whereby the conveyer can be removed and the wagon utilized for ordinary purposes.

A further object of the invention is to provide an end gate which coöperates with the distributing mechanism to insure a complete discharge of the fertilizing material from the wagon.

Figure 2:
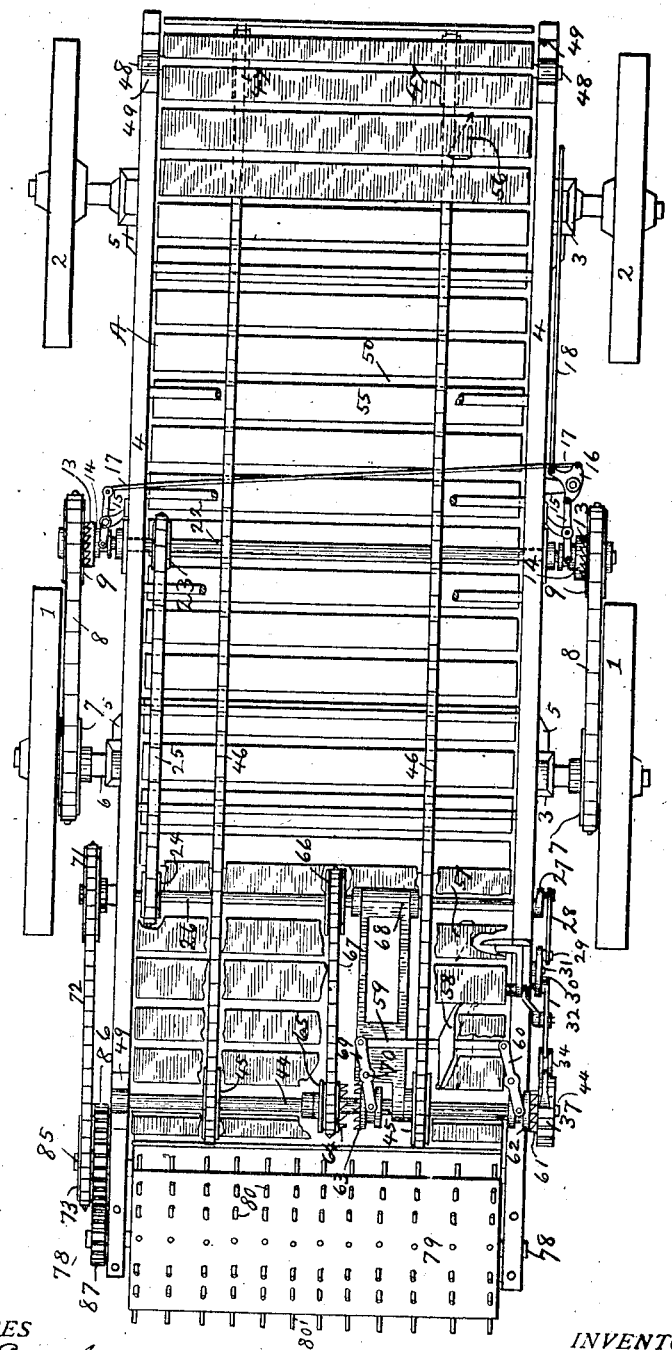

Referring to the drawings in which corresponding letters indicate corresponding parts in all of the figures of the drawings: Figure 1 is a side elevation of my improved fertilizing device with separate parts in section and broken away. Fig. 2 is a plan view of the device with the sides of the wagon removed and parts of the mechanism broken away, and Fig. 3 is a detail side elevation of the end gate in the raised position.

The conveyer A is secured to an ordinary wagon which is provided with wheels 1 and 2, an axle 6 for the rear wheels, and standards 3. Adjacent to said standards are lugs 5 for abutting against the same and holding the conveyer and its combination mechanism on said wagon through the medium of a frame work consisting of beams or timbers 4. Secured to the rear wheels 1 of the wagon are sprocket wheels 7 which support sprocket chains 8. Said sprocket chains are connected to sprocket wheels 9 mounted on shaft 22. Said sprocket wheels 9 run loosely on said shaft 22 and are provided with a clutch mechanism 13, and mesh with a corresponding clutch mechanism 14 which is splined or grooved to said shaft 22. Connected to said clutches 14 are shippers 15 which are operated by a double bell crank lever 16. Connected to said bell crank lever is a rod 17 which connects with a shipper on the opposite side of the wagon. Attached to the long arm of said bell crank lever is a rod 18 which is connected to a lever 19 on the forward end of the wagon. Said lever is operated by the driver and is provided with a latch 21 for engaging in a toothed segment 20. On shaft 22 previously referred to is a sprocket wheel 23 having a sprocket chain thereon 25 which connects with a sprocket wheel 24 located on a shaft 26, said shaft 26 being the drive shaft of the conveyer A. Secured at one end of said drive shaft 26 is a crank 27 provided with a rod 28 which is pivoted at 29 to a slotted lever 30. Said slotted lever is pivoted at 31 and provided with a slot 33 which supports an operating arm 32. Said operating arm has attached at one end links 34, which carry on their free ends pawls 35 and 36. Said pawls operate a ratchet wheel 37 which will be hereinafter more fully described. Attached to operating arm 32 is a rod 38 which connects to a bell crank lever 39. Said bell crank lever is operated by a rod 40 by means of a lever 41 which is pivoted to the side of the wagon 90. Said lever is operated by the driver and has attached thereon a latch 43 for engaging a tooth segment 42. Ratchet wheel 37 previously referred to is mounted on shaft 44. Said ratchet wheel is operated through the slotted lever 30 and pawls 35 and 36 which rotate said shaft 44 which in turn operates the sprocket wheels 45 and 47 through the medium of sprocket chain 46. Sprocket wheels 47 are mounted on a shaft 48 supported by suitable boxes 49. Said sprocket chains 46 have mounted thereon for about three-fourths of their length a covering 50 which may be made of suitable material such as canvas or other material. Mounted on said covering are slats 55 for receiving the manure on the fertilizer distributer. Immediately under the sprocket chain 46 are rollers 84 for supporting said conveyer when loaded. Attached to the slats 55 of said conveyer are lugs 56 and 57 which are tapering on their opposite sides for engaging a cam plate 58 which is supported on a bar 59. Said bar 59 connects the two opposing shipping levers 60 and 69. Said levers are attached at one end to clutches 62 and 63. On the same shaft 44 are two other clutches 61 and 64. The clutch 64 is loose on shaft 44 while the clutch 61 is attached to the ratchet wheel 37, which is loose on the shaft 44.

Attached to clutch 64 is a sprocket wheel 65, which is connected to a sprocket wheel 66 of larger diameter on shaft 26 by means of a sprocket chain 67. Shaft 26 supports a platform 68. The opposite end of said platform 68 is supported by shaft 44, the object of which is to support the fulcrum of shipper 69. At the side of frame 4 and on the end of shaft 26 is a sprocket wheel 71 which is provided with a sprocket chain 72 which gives motion to a sprocket wheel 73 keyed upon a rotatable stud 85; also keyed on said stud 85, is a spur gear wheel 86, which meshes with a spur pinion 87 on shaft 78. Also mounted on shaft 78 is a scattering wheel 79 which is provided with pins 80 which can be made of wood or metal. Immediately above said scattering wheel 80 is a stationary guard 81 which is provided with pins 82. Said pins 82 allow the pins 80 on scattering wheel 79 to pass between them so as to grind up and separate the manure into fine particles so that it can be more evenly distributed over the field.

In Fig. 1 I have shown the application of an end gate which also serves as a follower and in this function coöperates with the conveyer A in effecting a discharge of the material. To this end I provide preferably upon each side of the wagon body a casting 115 of substantial U shape and provided with rearwardly extending legs 116 formed with longitudinal slots 117. The castings 115 loosely are mounted upon a transverse shaft 118. A toothed member 119 is mounted upon the shaft 118 adjacent one of said castings 115 and has rigid connection with said casting. A link 120 is also mounted upon the shaft 118 and has pivotal connection at its upper end with a rod 121 connected with the lower end of the lever 19.

The link 120 carries adjacent its upper end a pivoted pawl 122 for operative engagement with the member 119. Pivotally depending from the pawl 122 is a member 123 designed to be engaged by means provided upon the conveyer in a manner to be described. A curved end gate 124 is supported between the castings 115 and has longitudinal movement with relation thereto by virtue of antifrictional projections 125 engaging in the slots 117. The end gate 124 is provided with a depending leg 126 designed to be engaged by an element provided therefor. Mounted adjacent the rear end of the conveyer A are castings 127 and 128, the latter being rearwardly of and spaced away from the former. The casting 128 is provided with an inclined surface designed to serve as a cam for engagement with the member 123, and its appurtenant mechanisms.

The operation of the end gate is as follows: When the conveyer is started in its operative travel by the proper movement of the lever 19, the link 120 will be rocked forwardly upon the shaft 118 and will carry the pawl 122 therewith. Inasmuch as the pawl 122 is normally engaged with the member 119, carried by the casting 115, the movement of the pawl serves to raise the castings 115 upon the shaft 118 as a fulcrum until said castings have assumed a substantially vertical position. The end gate 124 will then drop by gravity to the lowermost edges of the slots 117 where it will be supported during the movement of the conveyer. As the rear end of the conveyer approaches the member 123, the casting 128 will engage said member and raise the pawl 122 upon its pivot to release the same from the member 119, said member 123 being held to move vertically, only, upon contact therewith of the casting 128, by means of a stop pin 123° extending from the casting 115. The castings 115 will then drop by gravity to their normal horizontal position. In this relation of parts, the casting 127 engages the lug 126 and forces the end gate 124 forwardly, said end gate thereby serving as a follower to effect a complete discharge of material upon the distributing reels. The upper slot 117 is preferably slightly shorter than the lower slot and when the end gate reaches the termination of its forward movement the upper connection 125 serves as a pivot and allows the end gate to swing slightly so that its lower end is raised to permit of the passage thereby of the castings 127 and 128 in their continued forward movement. When the lever 19 is thrown to operative position, the elements connected therewith assume their normal relation as will be readily understood.

The operation of my improved fertilizer distributer is as follows: The manure or other fertilizing materials are placed on the conveyer A which is formed by the canvas 50 and slats 55, when it is carried to the rear of the wagon by sprocket wheels 7 and 9. The shaft 22 which is driven by said sprocket wheel 9 also operates the sprocket wheel 23 which in turn, through the medium of chain 25, operates shaft 26, which gives motion to the crank 27, thereby operating the rod 28. The slotted lever 30 operates the arm 32 which in turn operates the pawls 35 and 36 thus giving a rotary motion to ratchet wheel 37 by means of the reciprocating motion previously described. As said ratchet wheel moves forward it operates sprocket wheels 45 and 47 and chain 46 thereby carrying the fertilizer by means of said conveyer to the end where it is deposited on scattering wheel 79, and as said wheel 79 revolves, it has a tendency to throw the fertilizer on the ground, but the stationary guard 81 checks the fertilizer until it is somewhat pulverized, thus grinding up the fertilizer which makes it more desirable for the purpose used. As the conveyer continues to revolve it goes to the end of the wagon whereby lug 57 attached to said conveyer contacts with the cam 58, which operates the shifting rod 59 and thus detaches clutch 62 from clutch 61, thereby allowing ratchet wheel 37 to remain stationary and at the same time the slight momentum of the conveyer A being sufficient to close clutches 63 and 64, the clutches 61 and 62 and 63 and 64 being placed at such a distance apart, and the lugs 56 and 57 being placed in such relation to the cam 58 as to permit of such operation, thus rotating pulley 65 through the medium of the belt 67 and pulley 66. The speed at which the conveyer is run to its normal position is considerably greater than when distributing fertilizer to the soil which is obvious from the size of the pulleys 65 and 66. As said conveyer continues to move back to its normal position for reloading the manure it comes to a stop when its lug 56 engages the beveled edge of cam 58 thereby shifting the shippers 60 and 69 which operates ratchet wheel 37 similar to the previous operation until the entire load of manure is distributed from the wagon.

Having thus described my invention what I claim is:

1. In a fertilizer distributer, the combination with a wagon, and a movable conveyer therein, of a follower movably mounted adjacent one end thereof, means for raising said follower and holding the same in an inoperative position, and means for tripping down and actuating said follower, at a selected point in the movement of said conveyer to move with the conveyer, and to assist in discharging the material therefrom, substantially as described.

2. In a fertilizer distributer, the combination with a wagon, and a movable conveyer therein, of a follower movably mounted adjacent one end thereof, means for raising said follower and holding the same in an inoperative position, and means for tripping down and actuating said follower, at a selected point in the movement of said conveyer, to move with the conveyer and assist in discharging the material therefrom, and to subsequently operate as an end gate for said wagon, substantially as described.

3. In a fertilizer distributer, the combination with a wagon, a forwardly and rearwardly movable conveyer therein, and means for automatically reversing the movement of said conveyer, of a follower movably mounted adjacent one end thereof, means for raising and holding the said follower in an inoperative position, and means for tripping down and actuating said follower, at a selected point in the forward movement of said conveyer, to move with the same and assist in discharging the material therefrom, substantially as described.

4. In a fertilizer distributer, the combination with a wagon, a forwardly and rearwardly movable conveyer therein, and means for automatically reversing the movement of said conveyer, of a follower movably mounted, adjacent one end thereof, means for raising and holding the said follower in an inoperative position, and means for tripping down said follower, at a selected point in the forward movement of said conveyer, to initially move with the conveyer, and assist in discharging the material therefrom and to subsequently operate as an end gate for said wagon, substantially as described.

5. In a fertilizer distributer, the combination with a wagon, and a movable conveyer therein, of a follower, movably mounted adjacent one end thereof, means for raising and holding said follower in an inoperative position, and means for automatically tripping down and actuating said follower, at a selected point in the movement of said conveyer, to move with the conveyer and to assist in discharging the material therefrom, substantially as described.

6. In a fertilizer distributer, the combination with a wagon, and a movable conveyer therein, of a follower movably mounted adjacent one end thereof, means for raising and holding said follower in an inoperative position, and means for automatically tripping down said follower, at a selected point in the movement of said conveyer to initially move with the same, and assist in discharging the material therefrom, and to subsequently operate as an end gate for said wagon, substantially as described.

7. In a fertilizer distributer, the combination with a wagon, and forwardly and rearwardly movable conveyer therein, and means for automatically reversing the movement of said conveyer, of a follower movably mounted adjacent one end thereof, means for raising and holding said follower in an inoperative position, and means for automatically tripping down and actuating said follower, at a selected point in the forward movement of said conveyer, to move with the same and assist in discharging the material therefrom, substantially as described.

8. In a fertilizer distributer, the combination of a wagon, and a movable conveyer therein, of a follower movably mounted adjacent one end thereof, manually operable means for tripping down and actuating in an inoperative position, and automatic means for tripping down and actuating said follower, at a selected point in the movement of said conveyer, to move with the same and to assist in discharging the material therefrom, substantially as described.

9. In a fertilizer distributer, the combination with a wagon, and a movable conveyer therein, a follower movably mounted adjacent one end thereof, manually operable means for raising and holding said follower in an inoperative position, and automatic means for tripping down and actuating said follower, at a selected point in the movement of said follower, to initially move with the conveyer, and assist in discharging the material therefrom, and to subsequently operate as an end gate for said wagon, substantially as described.

10. In a fertilizer distributer, the combination with a wagon, a forwardly and rearwardly movable conveyer therein, and means for automatically reversing the movement of said conveyer, of a follower movably mounted adjacent one end thereof, manually operable means for raising and holding said follower in an inoperative position, and automatic means for tripping down and actuating said follower, at a selected point in the forward movement of said follower, to move with the same and assist in discharging the material therefrom, substantially as described.

In testimony whereof I affix my signature in presence of two witnesses.

LOREN G. HERRICK.

Witnesses:
 B. E. SCHUCK,
 BERT CASS.